United States Patent
Zhang et al.

(10) Patent No.: US 9,635,588 B2
(45) Date of Patent: Apr. 25, 2017

(54) METHOD AND APPARATUS FOR COORDINATED MULTI-POINT TRANSMISSION WITH NEGOTIATED QUALITY OF SERVICE

(75) Inventors: Gong Zhang, Shenzhen (CN); Cheng He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 13/338,183

(22) Filed: Dec. 27, 2011

(65) Prior Publication Data
US 2012/0093019 A1    Apr. 19, 2012

Related U.S. Application Data

(63) Continuation of application No. PCT/CN2010/074554, filed on Jun. 26, 2010.

(30) Foreign Application Priority Data

Jul. 6, 2009   (CN) .......................... 2009 1 0151935

(51) Int. Cl.
*H04L 1/00*     (2006.01)
*H04W 28/24*   (2009.01)
(Continued)

(52) U.S. Cl.
CPC ............ *H04W 28/24* (2013.01); *H04L 45/24* (2013.01); *H04L 45/302* (2013.01); *H04L 45/42* (2013.01);
(Continued)

(58) Field of Classification Search
CPC . H04J 11/0053; H04W 40/02; H04W 76/025; H04W 92/045
(Continued)

(56) References Cited

U.S. PATENT DOCUMENTS

2002/0181395 A1* 12/2002 Foster ................... H04L 49/357
                                                                370/229
2005/0117580 A1*  6/2005 del Val ................ H04L 12/5695
                                                                370/395.2
(Continued)

FOREIGN PATENT DOCUMENTS

CN       101218841 A    7/2008
CN       101316374 A   12/2008
(Continued)

OTHER PUBLICATIONS

Written Opionion of the International Searching Authority dated Oct. 28, 2010 in connection with International Patent Applictaion No. PCT/CN2010/074554.
(Continued)

*Primary Examiner* — Faisal Choudhury

(57) ABSTRACT

The present invention discloses a communication method, a device and a communication system. The technical solutions provided by the present invention include: a Base Station Router (BSR) and a service server. The BSR is configured to make a Mobile Station (MS) access a network, obtain information of multiple transmission paths from the service server during a process for the MS to apply to the service server for a service, and provide a communication service for the MS and the service server by using a multi-path transmission scheme. The service server, connected with the BSR, is configured to obtain information of QoS required by the service applied by the MS, determine the multiple transmission paths according to the information of the QoS, and communicate with the MS by using the multi-path transmission scheme.

5 Claims, 7 Drawing Sheets

(51) Int. Cl.
*H04L 12/707* (2013.01)
*H04L 12/725* (2013.01)
*H04L 12/717* (2013.01)
*H04W 40/02* (2009.01)
*H04W 76/02* (2009.01)
*H04W 92/04* (2009.01)

(52) U.S. Cl.
CPC .......... *H04W 40/02* (2013.01); *H04W 76/025* (2013.01); *H04W 92/045* (2013.01)

(58) Field of Classification Search
USPC ........................................................ 370/252
See application file for complete search history.

(56) References Cited

U.S. PATENT DOCUMENTS

| | | | |
|---|---|---|---|
| 2006/0072457 A1* | 4/2006 | Noble ................ | H04L 41/0893 370/230 |
| 2006/0083193 A1* | 4/2006 | Womack et al. ............ | 370/328 |
| 2006/0218298 A1* | 9/2006 | Knapp et al. ................ | 709/238 |
| 2007/0133449 A1 | 6/2007 | Schacht et al. | |
| 2007/0286117 A1* | 12/2007 | Balasubramanian et al. ............................ | 370/328 |
| 2008/0137615 A1* | 6/2008 | Park et al. .................... | 370/332 |
| 2008/0144513 A1* | 6/2008 | Small ................ | H04L 12/2602 370/238 |
| 2008/0253335 A1 | 10/2008 | Bosch et al. | |
| 2008/0273520 A1* | 11/2008 | Kim et al. .................... | 370/345 |
| 2009/0040983 A1* | 2/2009 | Kim et al. .................... | 370/331 |
| 2009/0046674 A1* | 2/2009 | Gao et al. .................... | 370/337 |
| 2009/0059832 A1* | 3/2009 | Jhamnani ............ | H04W 72/005 370/312 |
| 2009/0109922 A1* | 4/2009 | Livanos ........................ | 370/331 |
| 2009/0232019 A1* | 9/2009 | Gupta et al. .................. | 370/252 |
| 2009/0303881 A1* | 12/2009 | Tsirtsis et al. ................ | 370/235 |
| 2009/0305701 A1* | 12/2009 | Giaretta et al. ............ | 455/435.1 |
| 2010/0027471 A1* | 2/2010 | Palanki et al. ................ | 370/328 |
| 2010/0039936 A1* | 2/2010 | Jin et al. ....................... | 370/230 |
| 2010/0056215 A1* | 3/2010 | Gorokhov et al. ............ | 455/561 |
| 2010/0067435 A1* | 3/2010 | Balachandran ....... | H04L 5/0035 370/328 |
| 2010/0067450 A1* | 3/2010 | Balachandran et al. ...... | 370/329 |
| 2010/0250747 A1* | 9/2010 | Karaoguz et al. ............ | 709/226 |
| 2010/0272218 A1* | 10/2010 | Yeh et al. ..................... | 375/330 |
| 2010/0284345 A1* | 11/2010 | Rudrapatna et al. ......... | 370/329 |
| 2010/0309878 A1* | 12/2010 | Stolyar et al. ................ | 370/331 |
| 2010/0322128 A1* | 12/2010 | Becker et al. ................ | 370/312 |

FOREIGN PATENT DOCUMENTS

CN 101326780 A 12/2008
WO WO 2009/065467 A1 5/2009

OTHER PUBLICATIONS

Partial translation of Office Action dated Jan. 28, 2013 in connection with Chinese Patent Applictaion No. 200910151935.9.
Partial Translation of Office Action dated May 3, 2012 in connection with Chinese Patent Applictaion No. 200910151935.9.
Supplementary European Search Report dated Jul. 6, 2012 in connection with European Patent Applictaion No. EP 10 79 6711.
"3rd Generation Partnership Project; Technical Specification Group Services and System Aspects; 3GPP System Architecture Evolution: Report on Technical Options and Conclusions (Release 8)", 3GPP TR 23.882, V.8.0.0, Sep. 2008, 234 pages.
International Search Report dated Oct. 28, 2010 in connection with International Patent Applictaion No. PCT/CN2010/074554.

* cited by examiner

METHOD AND APPARATUS FOR COORDINATED MULTI-POINT TRANSMISSION WITH NEGOTIATED QUALITY OF SERVICE

CROSS-REFERENCE TO RELATED APPLICATIONS

This application is a continuation of International Application No. PCT/CN2010/074554, filed on Jun. 26, 2010, which claims priority to Chinese Patent Application No. 200910151935.9, filed on Jul. 6, 2009, all of which are hereby incorporated by reference in their entireties.

TECHNICAL FIELD

The present invention relates to the field of communications, and in particular, to a communication method, a device and a communication system.

BACKGROUND

Referring to FIG. 1, a network architecture of 3GPP Long-Term Evolution (LTE) and System Architecture Evolution (SAE) generally has network elements including: an eNode Base (eNB), a Mobility Management Entity (MME), a Serving Gateway (S-GW) and a Public Data Network Gateway (P-GW). In the network architecture, the wireless side is simplified in design compared to a Wideband Code Division Multiple Access (WCDMA) architecture, yet at the network side, the user data needs to be exchanged with the overall Internet through multiple network elements (such as an S-GW and a P-GW), thereby making the data transmission complex to be processed, which contributes to a relatively great delay. A network architecture provided by the prior art is capable of solving the problem above. Referring to FIG. 2, the network architecture integrates multiple network elements (including eNBs, an MME, an S-GW and a P-GW) as shown in FIG. 1 in a Base Station Router (BSR). When a user is in the cover range of a certain BSR, the user may get access to a network through the BSR and perform data exchange with the overall Internet through a transmission path. In the implementation of the present invention, the inventors found that the network architecture as shown in FIG. 2 is incapable of ensuring Quality of Service (QoS) for user communications, when a network has a single point of failure or congestion of the network occurs.

SUMMARY

Embodiments of the present invention provide a communication method, a device and a communication system, capable of improving QoS for user communications.

Embodiments of the present invention use technical solutions in the following.

A communication system includes: a BSR and a service server, where, the BSR is configured to make a Mobile Station (MS) access a network, obtain information of multiple transmission paths from the service server during a process for the MS to apply to a service server for a service, and provide a communication service for the MS and the service server by using a multi-path transmission scheme; and the service server, connected with the BSR, is configured to obtain information of QoS required by the service applied by the MS, determine the multiple transmission paths according to the information of the QoS, and communicate with the MS by using the multi-path transmission scheme.

Through the communication system provided in the embodiment of the present invention, the BSR is capable of providing the communication service for the MS and the service server by using the multi-path transmission scheme, and the MS and the server may communicate with each other through multiple paths, thereby improving the QoS for user communications, and solving the problem that the prior art is incapable of ensuring the QoS for user communications when a network has a single point of failure or congestion of the network occurs.

A service server includes:

an obtaining unit, configured to obtain information of QoS required by a service applied by an MS;

a determination unit, configured to determine multiple transmission paths according to the information of the QoS obtained by the obtaining unit; and a communication unit, configured to communicate with the MS by using a multi-path transmission scheme according to the multiple transmission paths determined by the determination unit.

A BSR includes:

a first obtaining unit, configured to obtain information of multiple transmission paths during a process for an MS to apply to a service server for a service; and a serving unit, configured to establish communication between the MS and the service server by using a multi-path transmission scheme according to the information of the multiple transmission paths obtained by the first obtaining unit.

A communication method includes: obtaining, by a service server, information of QoS required by a service applied by an MS; determining, by the service server, multiple transmission paths according to the information of the QoS; and communicating, by the service server, with the MS by using a multi-path transmission scheme.

A communication method includes: obtaining, by a BSR, information of multiple transmission paths during a process for an MS to apply to a service server for a service, where the transmission paths are determined by the service server or through negotiation of the BSR and the service server; and establishing, by the BSR, communication between the MS and the service server by using a multi-path transmission scheme according to the information of the multiple transmission paths.

Through the communication method and the device provided in the embodiments of the present invention, the communication service is provided for the MS and the service server by using the multi-path transmission scheme, where the MS and the server may communicate with each other through multiple paths, thereby improving the QoS for user communications, and solving the problem that the prior art is incapable of ensuring the QoS for user communications when a network has a single point of failure or congestion of the network occurs.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only about some embodiments of the present invention, and persons of ordinary skills in the art can derive other drawings from the accompanying drawings without creative efforts.

DETAILED DESCRIPTION

The technical solutions of the present invention will be clearly and completely described in the following with reference to the accompanying drawings in the embodiments of the present invention. It is obvious that the embodiments to be described are only a part rather than all of the embodiments of the present invention. All other embodiments obtained by persons of ordinary skills in the art based on the embodiments of the present invention without creative efforts shall fall within the protection scope of the present invention.

In order to solve the problem that a network architecture provided by the prior art is incapable of ensuring QoS for user communications, embodiments of the present invention provide a communication method, a device and a communication system.

Figure 1:
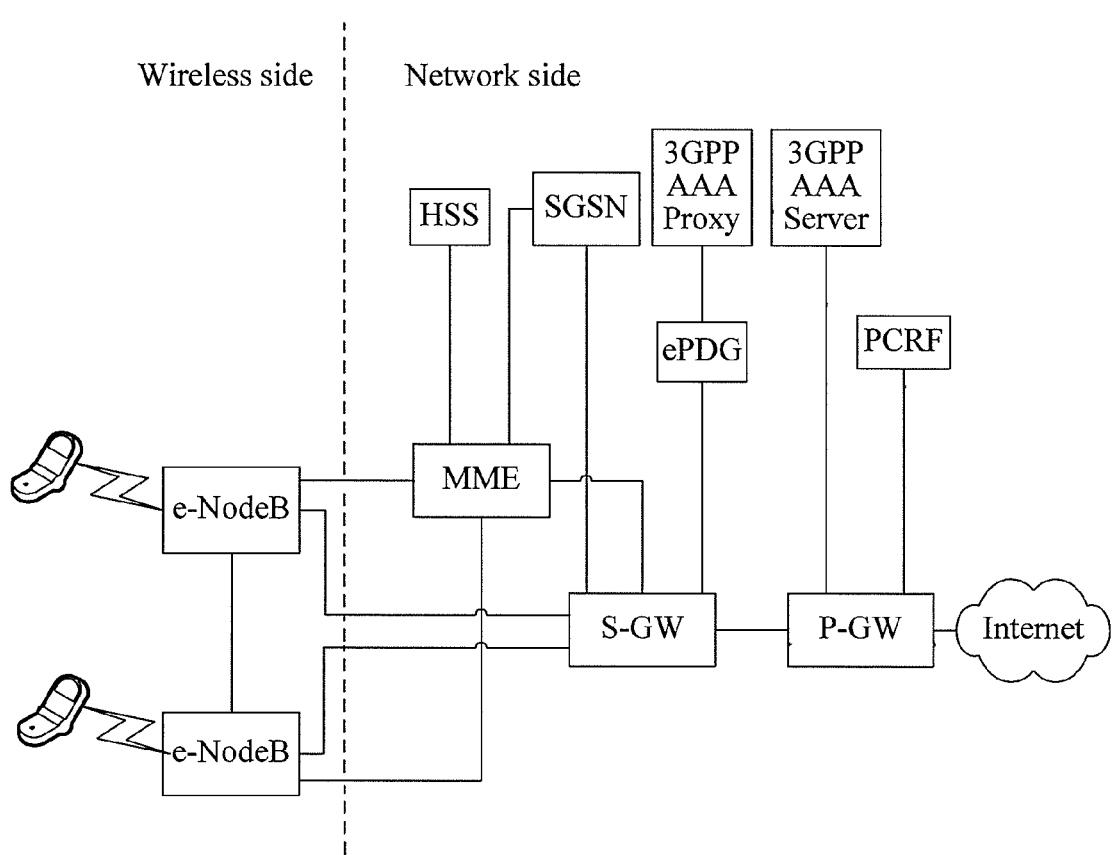
FIG. 1 is a first diagram of a network architecture according to the prior art.
Figure 2:
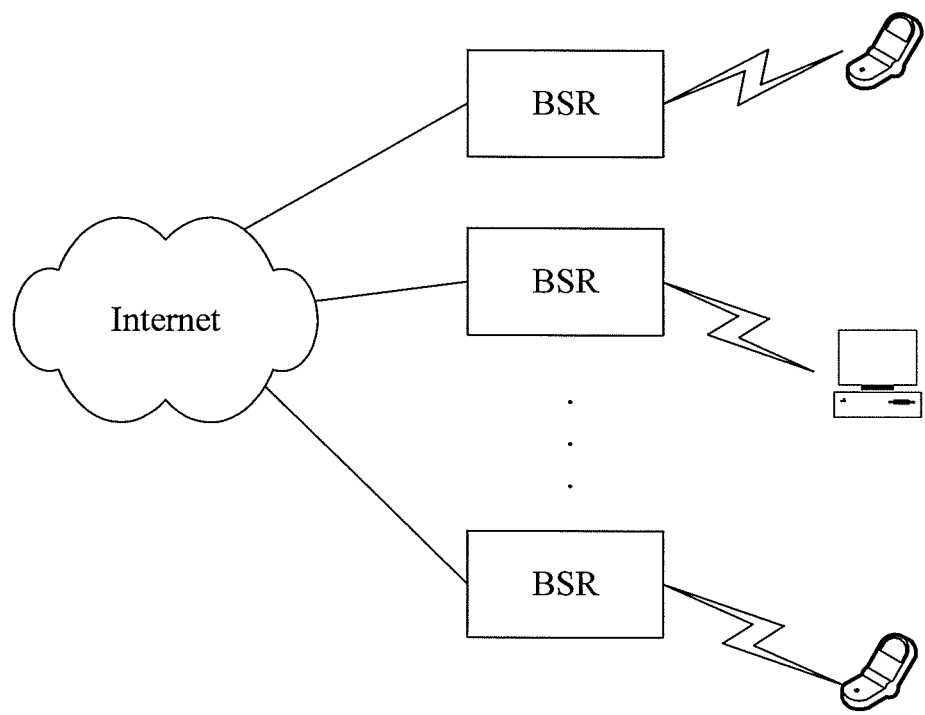
FIG. 2 is a second diagram of a network architecture according to the prior art.
Figure 3:
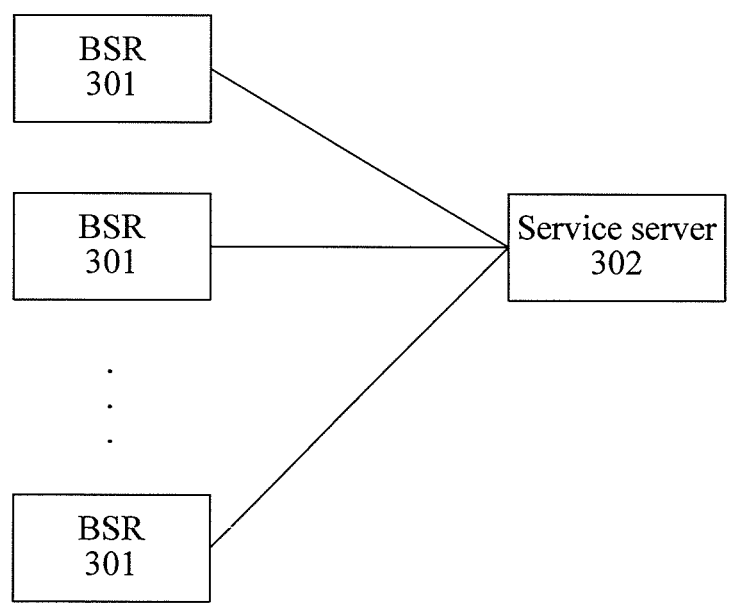
FIG. 3 is a schematic structure diagram of a communication system according to an embodiment of the present invention.

Referring to FIG. 3, an embodiment of the present invention provides a communication system, which includes a BSR 301 and a service server 302.

The BSR 301 is configured to make an MS access the network, obtain information of multiple transmission paths from the service server 302 during a process for the MS to apply to the service server 302 for a service, and provide a communication service for the MS and the service server 302 by using a multi-path transmission scheme.

In this embodiment, the BSR 301 includes function modules, such as a Base Station (BS), a BS processor, an MME, an S-GW and a P-GW, and the BSR 301 makes the MS access the network through the function modules; a cellular network has several BSRs 301, and each BSR 301 covers one or more cells.

In this embodiment, the BSR 301 may obtain the information of the multiple transmission paths from the service server 302 by using several methods, for example, the BSR 301 may negotiate with the service server 302 and determine the multiple transmission paths according to a negotiated result, or the service server 302 may determine the multiple transmission paths according to information of QoS and send the information of the paths to the BSR 301; however, not all scenarios are described in detail here.

The service server 302, connected with the BSR 301, is configured to obtain the information of the QoS required by the service applied by the MS, determine the multiple transmission paths according to the information of the QoS, and communicate with the MS by using the multi-path transmission scheme.

In this embodiment, the service server 302 may determine the multiple transmission paths by using several methods, for example, the service server 302 may negotiate with the BSR 301 and determine the multiple transmission paths according to a negotiated result, or the service server 302 may determine the multiple transmission paths according to the information of the QoS required by the service applied by the MS and according to a preset transmission policy; however, not all scenarios are described in detail here.

Furthermore, the BSR 301 is further configured to obtain the information of the QoS required by the service applied by the MS, determine a coordinated multi-point transmission scheme according to information of the QoS, and provide a communication service for the MS and the service server 302 by using the multi-path transmission scheme and the coordinated multi-point transmission scheme.

In this embodiment, the BSR 301 may first determine BSRs 301 (more than two), which are capable of providing services for the MS, specifically by using a user centered determination method or a determination method based on a network, which are not described in detail here; then negotiate with the BSRs 301 capable of providing the services for the MS, and determine the coordinated multi-point transmission scheme according to a negotiated result.

Moreover, when the BSR 301 is incapable of providing an application, which satisfies the QoS required by the service, for the MS, the BSR 301 is further configured to negotiate with the MS for lowering the QoS required by the service, or when the service server 302 is incapable of providing an application, which satisfies the QoS required by the service, for the MS, the service server 302 is further configured to negotiate with the MS for lowering the QoS required by the service.

Furthermore, the communication system provided in the embodiment of the present invention may also provide a mobility management function for the MS. Specifically, the BSR 301 may perform mobility management on the MS by using a distributed management mechanism.

The communication system provided in the embodiment of the present invention has a flat structure, thereby reducing the end-to-end transmission delay between the MS and the service server and improving the communication performance of the system; the BSR is capable of providing the communication service for the MS and the service server according to the multi-path transmission scheme and/or the coordinated multi-point transmission scheme, thereby improving the robustness and the QoS of the system and avoiding the problem that the QoS for user communications cannot be ensured when the MS is located at the edge of a cell covered by the BSR, or when a network has a single point of failure or congestion of the network occurs; and the communication system provided in the embodiment of the present invention has the mobility management function, when an MS switches between cells, the BSR may perform the mobility management on the MS, thereby ensuring that the MS can perform normal communications after the cell switch.

Figure 4:
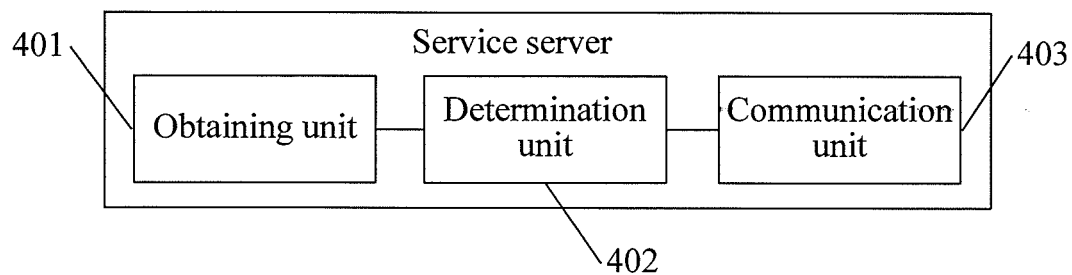
FIG. 4 is a first schematic structure diagram of a service server according to an embodiment of the present invention.

Referring to FIG. 4, an embodiment of the present invention also provides a service server, which includes:

an obtaining unit 401, configured to obtain information of QoS required by a service applied by an MS;

a determination unit 402, configured to determine multiple transmission paths according to the information of the QoS obtained by the obtaining unit 401; and a communication unit 403, configured to communicate with the MS by using a multi-path transmission scheme according to the multiple transmission paths determined by the determination unit 402.

Figure 5:
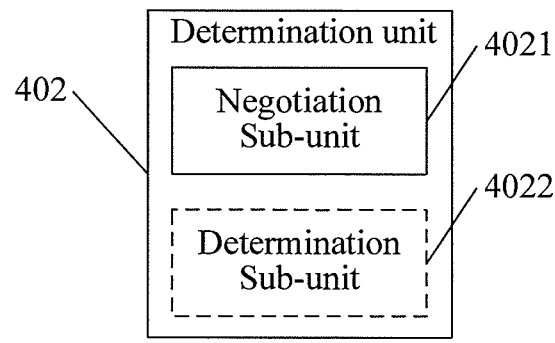
FIG. 5 is a schematic structure diagram of a determination unit of a service server according to an embodiment of the present invention shown in FIG. 4.

Moreover, referring to FIG. 5, the determination unit 402 may include:

a negotiation sub-unit 4021, configured to negotiate with a BSR according to the information of the QoS obtained by the obtaining unit 401, and determine the multiple transmission paths according to a negotiated result; or a determination sub-unit 4022, configured to determine the multiple transmission paths according to the information of the QoS obtained by the obtaining unit 401 and according to a preset transmission policy.

Figure 6:
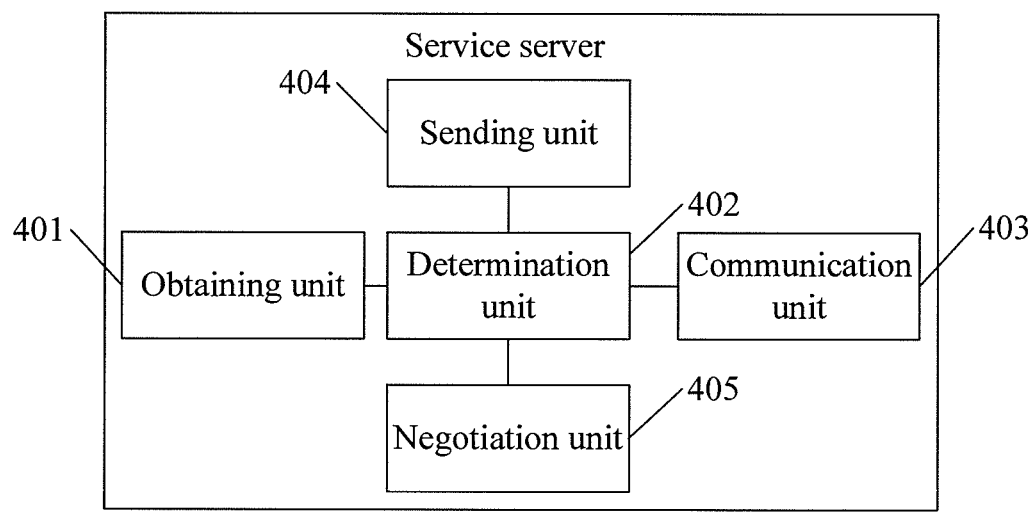
FIG. 6 is a second schematic structure diagram of a service server according to an embodiment of the present invention.

Moreover, referring to FIG. 6, the service server may further include:

a sending unit 404, configured to send the information of the multiple transmission paths determined by the determination unit 402 to the BSR.

Moreover, referring to FIG. 6, the service server may further include:

a negotiation unit 405, configured to negotiate with the MS for lowering the QoS required by the service when the service server is incapable of providing an application, which satisfies the QoS required by the service, for the MS, and obtain information of the negotiated QoS.

The determination unit 402 is further configured to determine the multiple transmission paths according to the information of the negotiated QoS obtained by the negotiation unit 405.

The service server provided in the embodiment of the present invention is capable of determining the multiple transmission paths for the MS, and communicating with the MS through the multiple transmission paths by using the multi-path transmission scheme, thereby improving the robustness and the QoS of the system, optimizing the system performance and solving the problem that the prior art is incapable of ensuring the QoS for user communications when a network has a single point of failure or congestion of the network occurs.

Figure 7:
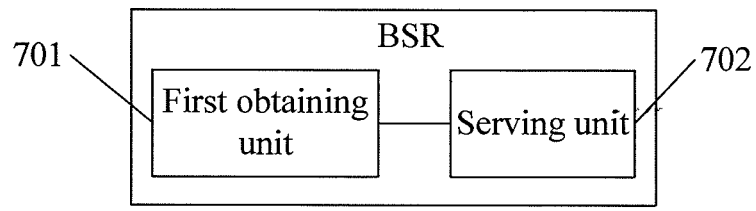
FIG. 7 is a first schematic structure diagram of a BSR according to an embodiment of the present invention.

Referring to FIG. 7, an embodiment of the present invention also provides a BSR, which includes:

a first obtaining unit 701, configured to obtain information of multiple transmission paths during a process for an MS to apply to a service server for a service; and a serving unit 702, configured to establish communication between the MS and the service server by using a multi-path transmission scheme according to the information of the multiple transmission paths obtained by the first obtaining unit 701.

Figure 8:
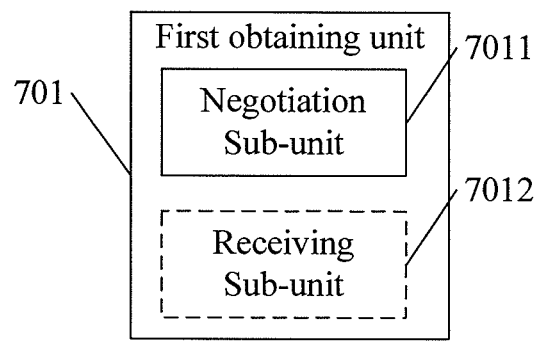
FIG. 8 is a schematic structure diagram of a first obtaining unit of a BSR according to an embodiment of the present invention shown in FIG. 7.

Moreover, referring to FIG. 8, the first obtaining unit 701 may further include:

a negotiation sub-unit 7011, configured to negotiate with the service server and obtain the information of the multiple transmission paths according to a negotiated result; or a receiving sub-unit 7012, configured to receive the information of the multiple transmission paths, where the information of the multiple transmission paths is sent by the service server.

Figure 9:
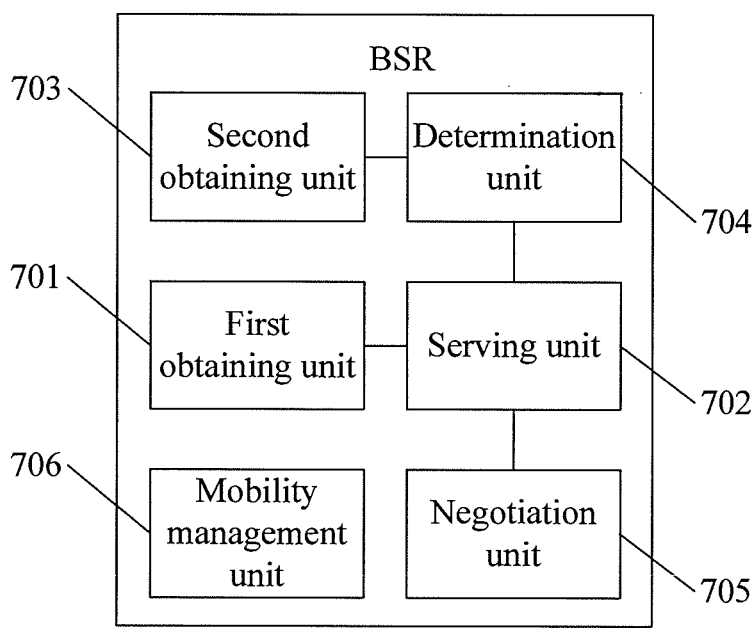
FIG. 9 is a second schematic structure diagram of a BSR according to an embodiment of the present invention.

Moreover, referring to FIG. 9, the BSR may further include:

a second obtaining unit 703, configured to obtain information of QoS required by the service applied by the MS; and a determination unit 704, configured to determine a coordinated multi-point transmission scheme according to the information of the QoS obtained by the second obtaining unit 703.

The serving unit 702 is further configured to establish communication between the MS and the service server by using the multi-path transmission scheme and the coordinated multi-point transmission scheme, which is determined by the determination unit 704, according to the information of the multiple transmission paths obtained by the first obtaining unit 701.

Moreover, referring to FIG. 9, the BSR may further include:

a negotiation unit 705, configured to negotiate with the MS for lowering the QoS required by the service when the BSR is incapable of providing an application, which satisfies the QoS required by the service, for the MS, and obtain information of the negotiated QoS.

The determination unit 704 is further configured to determine the coordinated multi-point transmission scheme according to the information of the negotiated QoS obtained by the negotiation unit 705.

Moreover, referring to FIG. 9, the BSR may further include:

a mobility management unit 706, configured to perform mobility management on the MS by using a distributed management mechanism.

The BSR provided in the embodiment of the present invention is capable of establishing the communication between the MS and the service server according to the multi-path transmission scheme and/or the coordinated multi-point transmission scheme, thereby improving the robustness and the QoS of the system and avoiding the problem that the QoS for user communications cannot be ensured when the MS is located at the edge of a cell covered by the BSR, or when a network has a single point of failure or congestion of the network occurs; the BSR provided in the embodiment of the present invention is capable of performing the mobility management on the MS when the MS switches between cells, thereby ensuring that the MS can perform normal communications after the cell switch.

Figure 10:
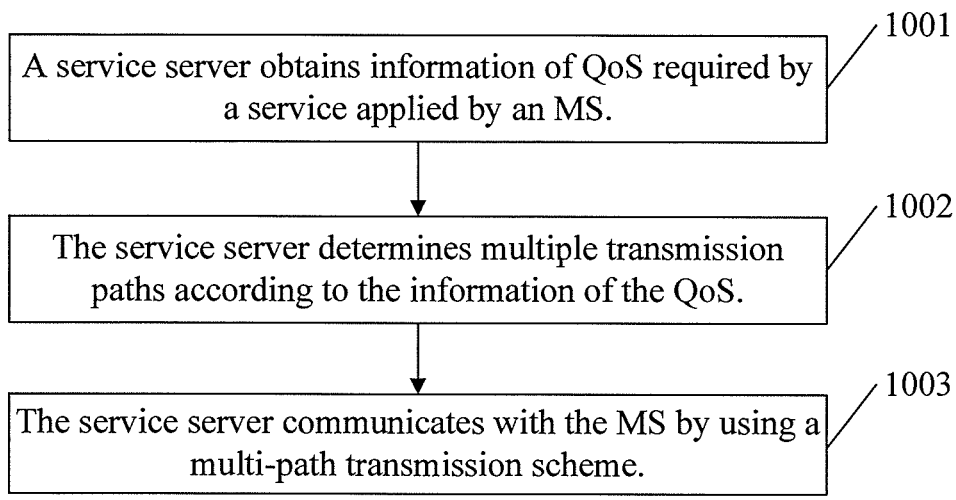
FIG. 10 is a flow chart of a communication method according to an embodiment of the present invention.

Referring to FIG. 10, an embodiment of the present invention also provides a communication method, which includes the following steps.

Step 1001: A service server obtains information of QoS required by a service applied by an MS.

Step 1002: The service server determines multiple transmission paths according to the information of the QoS.

In the step, the service server may determine the multiple transmission paths by using several methods, for example, the service server may negotiate with the BSR and determine the multiple transmission paths according to a negotiated result, or the service server may determine the multiple transmission paths according to a preset transmission policy; however, not all scenarios are described in detail here.

Step 1003: The service server communicates with the MS by using a multi-path transmission scheme.

Optionally, in this embodiment, when in step 1002 the service server determines the multiple transmission paths according to the preset transmission policy, after the step 1002 the method may further include: sending, by the service server, information of the multiple transmission paths to the BSR.

Optionally, after step 1001 and before step 1002, if it is determined that the service server is incapable of providing an application, which satisfies the QoS required by the service, for the MS, the method may further include: negotiating, by the service server, with the MS for lowering the QoS required by the service and obtaining information of the negotiated QoS; at this time, step 1002 is: determining, by the service server, the multiple transmission paths according to the information of the negotiated QoS.

In the communication method provided in the embodiment of the present invention, the service server is capable of determining multiple transmission paths and communicating with the MS by using the multi-path transmission scheme, thereby improving the robustness and the QoS of the system, optimizing the system performance and solving the problem that the prior art is incapable of ensuring the QoS for user communications when a network has a single point of failure or congestion of the network occurs.

Figure 11:
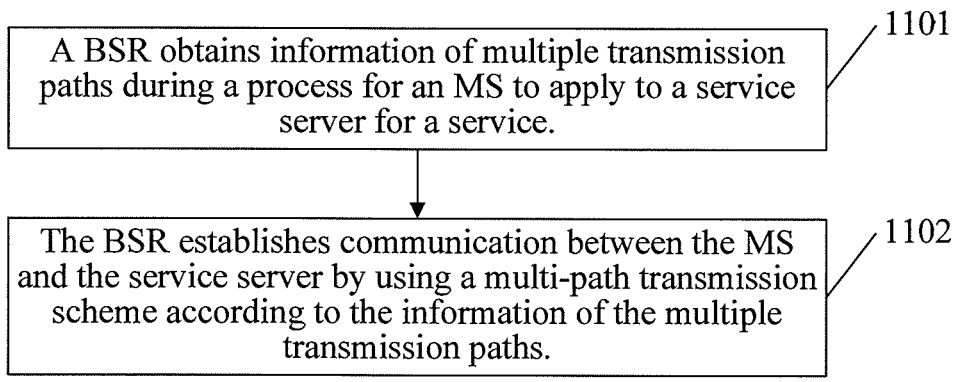
FIG. 11 is a flow chart of a communication method according to another embodiment of the present invention.

Referring to FIG. 11, another embodiment of the present invention also provides a communication method, which includes the following steps.

Step 1101: A BSR obtains information of multiple transmission paths during a process for an MS to apply to a service server for a service.

In the step, the BSR may obtain the information of the multiple transmission paths by using several methods, for example, the BSR may negotiate with the service server and obtain the information of the multiple transmission paths according to a negotiated result, or the BSR may receive the information of the multiple transmission paths, where the information of the multiple transmission paths is sent by the service server; however, not all scenarios are described in detail here.

Step 1102: The BSR establishes communication between the MS and the service server by using a multi-path transmission scheme according to the information of the multiple transmission paths.

Optionally, before step 1102, the method may further include: obtaining, by the BSR, information of QoS required by the service applied by the MS and determining, by the BSR, a coordinated multi-point transmission scheme according to the information of the QoS; at this time, step 1102 may be: establishing, by the BSR, the communication between the MS and the service server by using the multi-path transmission scheme and the coordinated multi-point transmission scheme.

Optionally, after step 1101, if it is determined that the BSR is incapable of providing an application, which satisfies the QoS required by the service, for the MS, the method may further include: negotiating, by the BSR, with the MS for lowering the QoS required by the service and obtaining information of the negotiated QoS; at this time, the BSR may determine the coordinated multi-point transmission scheme according to the information of the negotiated QoS.

Optionally, when the MS switches between cells, the method provided in the embodiment of the present invention may further include the step of performing mobility management on the MS. Specifically, the BSR may perform the mobility management on the MS by using a distribution mechanism.

In the communication method provided in the embodiment of the present invention, the BSR is capable of establishing the communication between the MS and the service server according to the multi-path transmission scheme and/or the coordinated multi-point transmission scheme, thereby improving the robustness and the QoS of the system and avoiding the problem that the QoS for user communications cannot be ensured when the MS is located at the edge of a cell covered by the BSR, or when a network has a single point of failure or congestion of the network occurs. When the MS switches between cells, the communication method provided in the embodiment of the present invention is capable of performing the mobility management on the MS, thereby ensuring that the MS can perform normal communications after the cell switch.

In order to make the technical solutions provided in the embodiments of the present invention more clear to be understood by persons of skills in the art, the communication method, the device and the communication system provided in the embodiments of the present invention are described in detail through a specific embodiment in the following.

Figure 12:
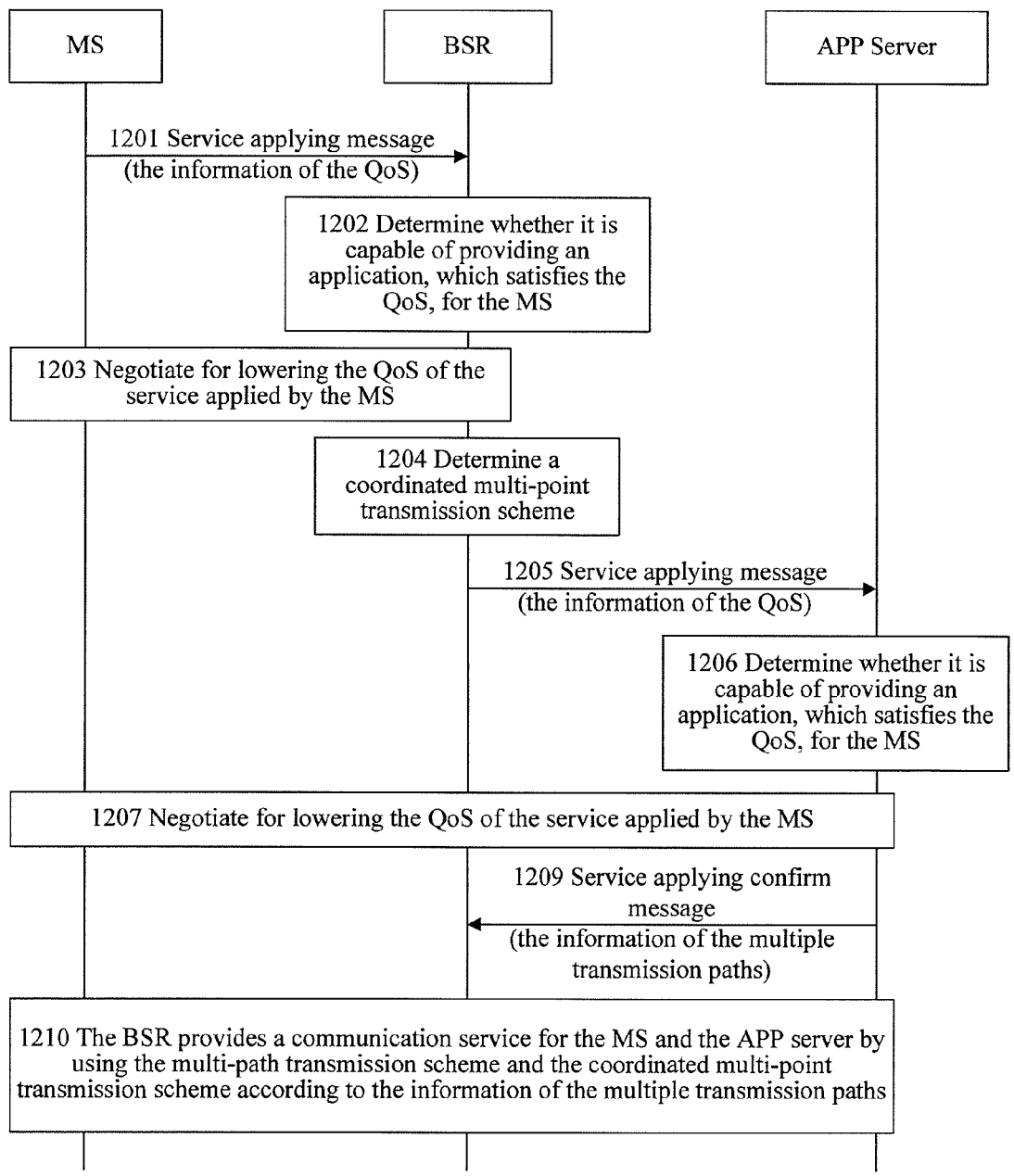
FIG. 12 is a sequence diagram of a communication method according to still another embodiment of the present invention.

In another embodiment of the present invention, an MS communicates with a service server (an APP server) through a BSR. Referring to FIG. 12, the communication method provided in the embodiment of the present invention includes the following steps.

Step 1201: The MS sends a service application message to the BSR, where the service application message carries information of a service that is applied to the APP server by the MS and information of QoS required by the service.

Step 1202: The BSR determines whether the BSR is capable of providing an application, which satisfies the QoS, for the MS, according to a resource allocation status of the BSR and the information of the QoS carried in the service application message. If the BSR is capable of providing the application, which satisfies the QoS, for the MS, or the BSR is capable of negotiating with an adjacent BSR for co-working to provide an application satisfying the QoS, perform step 1204; if the BSR is incapable of providing the application, which satisfies the QoS, for the MS, or the BSR is incapable of negotiating with the adjacent BSR for co-working to provide the application satisfying the QoS, perform step 1203.

Step 1203: The BSR negotiates with the MS for lowering the QoS of the service applied by the MS. If the negotiation is successful, perform step 1204; if the negotiation is not successful, the BSR notifies the MS that the service application fails and the whole service application process ends.

Step 1204: The BSR determines a coordinated multi-point transmission scheme.

In this embodiment, the BSR may determine BSRs, which are capable of providing services for the MS, specifically by using a user centered determination method or a determination method based on the network, which are not described in detail here; and then negotiate with the BSRs capable of providing the services for the MS, and determine the coordinated multi-point transmission scheme according to a negotiated result.

Step 1205: The BSR forwards the service application message to the APP server.

It should be noted that if the BSR has negotiated with the MS about the QoS in step 1203, and then, in this step, the applying message carries information of the negotiated QoS.

Step 1206: The APP server determines whether the APP server is capable of providing an application, which satisfies the QoS, for the MS, according to the resource allocation status of the APP server and the information of the QoS carried in the service application message forwarded by the BSR. If the APP server is capable of providing the application, which satisfies the QoS, for the MS, perform step 1208; if the APP server is incapable of providing the application, which satisfies the QoS, for the MS, perform step 1207.

Step 1207: The APP server negotiates with the MS for lowering the QoS of the service applied by the MS. If the negotiation is successful, perform step 1208; if the negotiation is not successful, the APP server notifies the MS that the service application fails and the whole service application process ends.

Step 1208: The APP server allocates resources to the MS and determines the multiple transmission paths according to the information of the QoS.

In this embodiment, the APP server specifically determines the multiple transmission paths according to the information of the QoS and a preset transmission policy.

Step 1209: The APP server sends a service application confirm message to the BSR, where the service application confirm message carries the information of the multiple transmission paths.

Step 1210: The BSR provides a communication service for the MS and the APP server by using the multi-path transmission scheme and the coordinated multi-point transmission scheme, which is determined in step 1204, according to the information of the multiple transmission paths carried in the service application confirm message.

Specifically, the BSR may forward the service application confirm message to the MS to notify the MS that the service application is successful; make the MS access the network by using a coordinated multi-point communication method; and at the same time send a message to the APP server to instruct the APP server to start data communication by using a multi-path transmission method.

Optionally, in step 1208, the APP server may also negotiate with the BSR and determine the multiple transmission paths according a negotiated result, at this time, step 1209 may not be performed; and in step 1210, the BSR establishes communication between the MS and the APP server by using the multi-path transmission scheme according to the information of the multiple transmission paths after negotiation.

Figure 13:
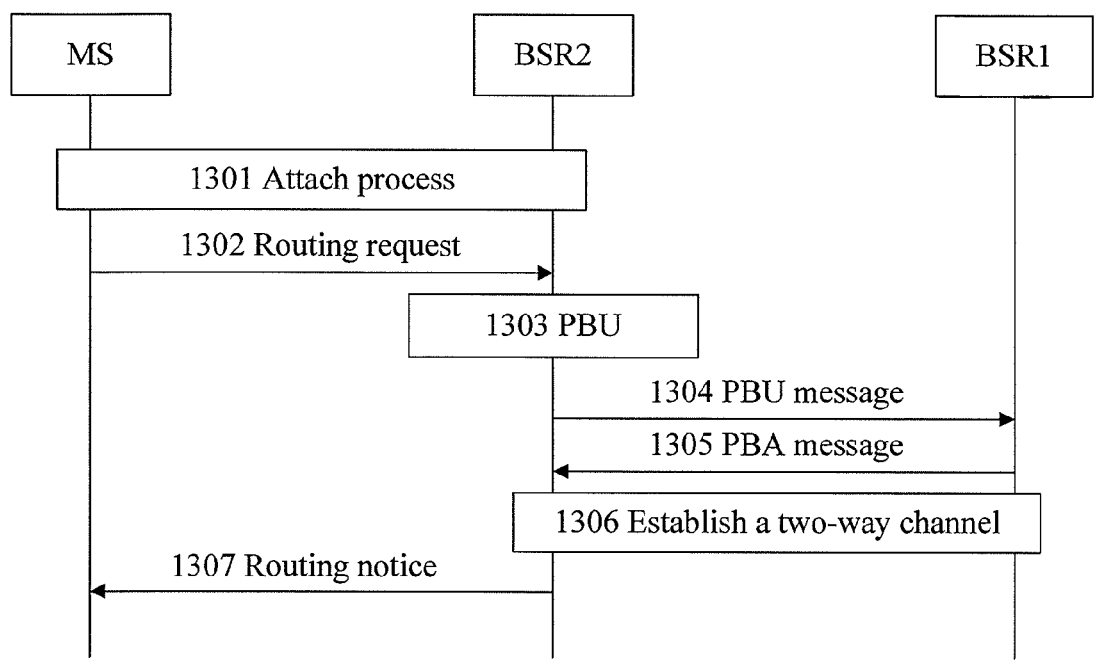
FIG. 13 is a sequence diagram that a BSR performs mobility management on an MS in a communication method according to an embodiment of the present invention shown in FIG. 12.

Optionally, when the MS switches between cells, the method provided in the embodiment of the present invention may further include the step of performing mobility management on the MS. In this embodiment, the BSR may perform the mobility management on the MS by using a distributed management mechanism. Referring to FIG. 13, the method includes the following steps.

Step 1301: When the MS switches from a network covered by a BSR 1 to a network covered by a BSR 2, the MS and the BSR 2 complete an attach process to obtain information of configuration of the current network.

Step 1302: The MS sends a routing request to the BSR 2.

Step 1303: The BSR 2 performs Proxy Binding Update (PBU) according to the routing request.

In this embodiment, the BSR 2 has functions of a Local Mobility Anchor (LMA) and a Mobile Access Gateway (MAG), and through an internal message process, the BSR 1 may achieve the PBU stipulated by a Proxy Mobile IPv6 (PMIPv6) Protocol.

Step 1304: The BSR 2 sends a PBU message to the BSR 1.

Step 1305: The BSR 1 performs corresponding operations according to the PBU message, and sends a Proxy Binding Acknowledgement (PEA) message to the BSR 2.

Step 1306: The BSR 2 establishes a two-way channel with the BSR 1 according to the PEA message.

Step 1307: The BSR 2 sends a routing notice to the MS to instruct the MS to continue communicating by using a primary address, thereby implementing the mobility management performed on the MS.

In the subsequent communication process, all communication data packets (including the received and the sent communication packets) of the MS are forwarded by the BSR 1 through the two-way channel between the BSR 2 and the BSR 1.

In the communication method provided in the embodiment of the present invention, the BSR is capable of providing the communication service for the MS and the service server according to the multi-path transmission scheme and/or the coordinated multi-point transmission scheme, thereby improving the robustness and the QoS of the system and avoiding the problem that the QoS for user communications cannot be ensured when the MS is located at the edge of a cell covered by the BSR, or when a network has a single point of failure or congestion of the network occurs. When the MS switches between cells, the BSR is capable of performing the mobility management on the MS, thereby ensuring that the MS can perform normal communications after the cell switch.

Those of ordinary skills in the art should understand that all or a part of the steps of the method according to the embodiments of the present invention may be implemented by a program instructing relevant hardware. The program may be stored in a computer readable storage medium, such as a Read-Only Memory (ROM), a Random-Access Memory (RAM), a magnetic disk, or an optical disk.

The foregoing descriptions are merely exemplary embodiments of the present invention, but are not intended to limit the protection scope of the present invention. Modifications or variations that can be figured out easily by persons skilled in the art within the technical scope of the present invention shall fall within the protection scope of the present invention. Therefore, the protection scope of the present invention shall be subject to the protection scope of the claims.

What is claimed is:

1. A communication system, comprising:
    a Base Station Router (BSR);
    a service server;
    wherein the BSR is configured to make a Mobile Station (MS) access a network, receive a service application message sent from the MS during a process for the MS to apply to the service server for a service, forward the service application message to the service server, and obtain information of multiple transmission paths from the service server to the MS, wherein the service application message comprising information of the service and information of Quality of Service (QoS) required by the service;
    wherein the service server, connected with the BSR, is configured to receive from the BSR the service application message, determine the multiple transmission paths according to the information of the QoS, and communicate with the MS through the multiple transmission paths; wherein each of the multiple transmission paths passes through a plurality of network elements, and wherein the BSR is further configured to obtain the information of the QoS required by the service applied by the MS, and provide a communication service for the MS and the service server by using a coordinated multi-point transmission scheme according to the information of the QoS, wherein the BSR is further configured to perform mobility management on the MS by using a distributed management mechanism;

the service server is further configured to:
  negotiate with the MS for lowering the QoS required by the service, when the service server is incapable of satisfying the QoS required by the service, to obtain information of the negotiated QoS;
  determine multiple transmission paths according to the information of the negotiated QoS and send information of the multiple transmission paths to the BSR that is determined according to the information of the negotiated QoS; and
  communicate with the MS through the multiple transmission paths that is determined according to the information of the negotiated QoS, and communicate with the MS using a coordinated multi-point transmission scheme determined according to the information of the negotiated QoS.

2. The communication system according to claim 1, wherein obtaining, by the BSR, the information of the multiple transmission paths from the service server comprises:
  determining, by the service server, the multiple transmission paths according to the information of the QoS, and sending the information of the paths to the BSR; or
  determining, by the BSR, the multiple transmission paths through negotiation with the service server.

3. A service server comprising:
  at least one processor and at least one memory, the at least one processor configured to:
    obtain, from a service application message, information of Quality of Service (QoS) required by a service applied by a Mobile Station (MS), wherein the service application message sent from the MS to a Base Station Router (BSR) during a process for the MS to apply for the service;
    determine multiple transmission paths from the service server to the MS according to the obtained information of the QoS, and communicate with the MS through the multiple transmission paths, wherein each of the multiple transmission paths passes through a plurality of network elements;
    negotiate with the MS for lowering the QoS required by the service when the service server is incapable of satisfying the QoS required by the service, to obtain information of the negotiated QoS;
    determine multiple transmission paths according to the information of the negotiated QoS;
    send information of the multiple transmission paths determined according to the information of the negotiated QoS to the BSR; and
    communicate with the MS through the multiple transmission paths determined according to the information of the negotiated QoS, and communicate with the MS using a coordinated multi-point transmission scheme determined according to the information of the negotiated QoS.

4. A Base Station Router (BSR) comprising:
  at least one processor and at least one memory, the at least one processor configured to:
    receive a service application message sent from a Mobile Station (MS) during a process for the MS to apply to a service server for a service, the service application message comprising information of the service and information of the Quality of Service (QoS) required by the service;
    forward the service application message to the service server;
    obtain information of multiple transmission paths from the service server to the MS;
  wherein the multiple transmission paths are determined according to the obtained information of the QoS, and each of the multiple transmission paths passes through a plurality of network elements
    determine a coordinated multi-point transmission scheme according to the obtained information of the QoS;
    establish communication between the MS and the service server by using the coordinated multi-point transmission scheme and according to the obtained information of the multiple transmission paths;
    obtain information of multiple transmission paths that is determined according to the information of a negotiated QoS; where in the negotiated QoS is obtained by the service server negotiating with the MS for lowering the QoS required by the service, when the service server is incapable satisfying the QoS required by the service;
    establish communication between the MS and the service server using a coordinated multi-point transmission scheme determined according to the information of the negotiated QoS;
    establish communication between the MS and the service server according to the multiple transmission paths that is determined according to the information of the negotiated QoS; and
    perform mobility management on the MS by using a distributed management mechanism.

5. A communication method, comprising:
  obtaining, by a service server, information of Quality of Service (QoS) required by a service applied by a Mobile Station (MS) from a received service application message, wherein the service application message sent from the MS to a Base Station Router (BSR) during a process for the MS to apply for the service;
  determining, by the service server, multiple transmission paths from the service server to the MS according to the obtained information of the QoS;
  communicating, by the service server, with the MS through the multiple transmission paths; wherein each of the multiple transmission paths passes through a plurality of network elements;
  sending, by the service server, the information of the multiple transmission paths to the BSR;
  wherein when the service server is incapable of satisfying the QoS required by the service, performing the following steps:
  negotiating, by the service server, with the MS for lowering the QoS required by the service to obtain information of the negotiated QoS;
    determining, by the service server, multiple transmission paths according to the information of the negotiated QoS; and communicating with the MS through the multiple transmission paths using a coordinated multi-point transmission scheme determined according to the information of the negotiated QoS.

* * * * *